United States Patent
Norris

(10) Patent No.: US 11,234,558 B2
(45) Date of Patent: Feb. 1, 2022

(54) TOOL FOR CLEANING A GRILL

(71) Applicant: Joseph Norris, Ottawa (CA)

(72) Inventor: Joseph Norris, Ottawa (CA)

( * ) Notice: Subject to any disclaimer, the term of this patent is extended or adjusted under 35 U.S.C. 154(b) by 0 days.

(21) Appl. No.: 17/106,968

(22) Filed: Nov. 30, 2020

(65) Prior Publication Data
US 2021/0076875 A1 Mar. 18, 2021

Related U.S. Application Data

(63) Continuation of application No. 16/104,558, filed on Aug. 17, 2018, now abandoned.

(60) Provisional application No. 62/547,504, filed on Aug. 18, 2017.

(51) Int. Cl.
| | | |
|---|---|---|
| A47J 37/07 | (2006.01) | |
| A47L 17/08 | (2006.01) | |
| A47L 13/06 | (2006.01) | |
| A47L 17/00 | (2006.01) | |
| B08B 1/00 | (2006.01) | |

(52) U.S. Cl.
CPC .......... *A47J 37/0786* (2013.01); *A47L 13/06* (2013.01); *A47L 17/00* (2013.01); *A47L 17/08* (2013.01); *B08B 1/005* (2013.01)

(58) Field of Classification Search
CPC . A47L 7/08; A47L 13/34; A47L 13/46; A47L 13/42; A47L 13/18; A47L 13/06; A47L 13/04; A47L 13/022; A47L 17/04; A47L 17/06; A47L 17/08; A47J 37/0786; A47J 43/288
USPC .................................. 15/227, 229.11–229.13
See application file for complete search history.

(56) References Cited

U.S. PATENT DOCUMENTS

| | | | |
|---|---|---|---|
| 1,569,854 A * | 1/1926 | Doerr | A47L 13/18 15/227 |
| 3,085,372 A | 4/1963 | Sweeney et al. | |
| 4,433,439 A * | 2/1984 | Sidman | A41D 19/01529 2/16 |
| 5,003,659 A | 4/1991 | Paepke | |
| 6,018,837 A | 2/2000 | Andreu | |
| 6,023,810 A | 2/2000 | Gessert | |
| 6,125,493 A | 10/2000 | Daw | |
| 6,916,382 B1 | 7/2005 | Aldredge | |

(Continued)

FOREIGN PATENT DOCUMENTS

| | | |
|---|---|---|
| CN | 101808561 A | 8/2010 |
| WO | WO2007106340 A2 | 9/2007 |
| WO | WO2009125376 A1 | 10/2009 |

OTHER PUBLICATIONS

International Preliminary Report on Patentability issued in Application No. PCT/CA2018/050998, dated Nov. 8, 2019.

(Continued)

*Primary Examiner* — Laura C Guidotti
(74) *Attorney, Agent, or Firm* — Middleton Reutlinger

(57) ABSTRACT

A grill-cleaning tool has a water-absorbent layer fabricated from a material that is suitable for transferring a volume of water. A fire-resistant layer is disposed outwardly of the water absorbent layer. A scrubbing outer layer fabricated from a metallic-mesh material covers both the fire-resistant layer and the water-absorbent layer. The water-absorbent layer and the heat-resistant layer may be incorporated into a single unit or may be separate layers. Fasteners are provided for assembling the layers together to form an assembled grill-cleaning tool.

12 Claims, 8 Drawing Sheets

(56) References Cited

U.S. PATENT DOCUMENTS

| | | |
|---|---|---|
| 7,168,124 B2 | 1/2007 | Dalias |
| D562,562 S | 2/2008 | Wales |
| D562,563 S | 2/2008 | Wales |
| D601,345 S | 10/2009 | Wales |
| D601,346 S | 10/2009 | Wales |
| D601,347 S | 10/2009 | Wales |
| D601,349 S | 10/2009 | Wales |
| D601,350 S | 10/2009 | Wales |
| D601,351 S | 10/2009 | Wales |
| D601,808 S | 10/2009 | Wales |
| D622,510 S | 8/2010 | Wales |
| D632,033 S | 2/2011 | Song et al. |
| 7,909,526 B2 | 3/2011 | Wales |
| 8,202,016 B2 | 6/2012 | Wales |
| 8,209,812 B1 | 7/2012 | Dondurur |
| D673,372 S | 1/2013 | Wales |
| D679,909 S | 4/2013 | Wales |
| D680,335 S | 4/2013 | Wales |
| D681,345 S | 5/2013 | Wales |
| D789,095 S | 6/2017 | Wales |
| 10,602,904 B2 * | 3/2020 | Weinberger ............ B25G 1/102 |
| 2005/0207820 A1 | 9/2005 | Franczak et al. |
| 2007/0187963 A1 | 8/2007 | Repp et al. |
| 2007/0231054 A1 | 10/2007 | Wales |
| 2007/0270088 A1 * | 11/2007 | Greenwood ............ B24B 23/04 451/73 |
| 2009/0056748 A1 | 3/2009 | Wales |
| 2010/0056413 A1 | 3/2010 | Harry et al. |
| 2010/0218326 A1 | 9/2010 | Yamaguchi |
| 2011/0258755 A1 | 10/2011 | Arfi |
| 2013/0247317 A1 | 9/2013 | Williams et al. |
| 2015/0230660 A1 | 8/2015 | Roth et al. |
| 2016/0135521 A1 * | 5/2016 | Thompson .............. A47L 17/08 2/161.6 |
| 2017/0143178 A1 | 5/2017 | Mesiti |
| 2018/0132689 A1 * | 5/2018 | Neiman .................. A47L 17/08 |
| 2019/0053668 A1 | 2/2019 | Norris |

OTHER PUBLICATIONS

International Search Report and Written Opinion for PCT/CA2018/050998, dated Nov. 16, 2018.

European Patent Office, Supplementary European Search Report issued in Application No. 18846413.5, dated Mar. 4, 2021.

* cited by examiner

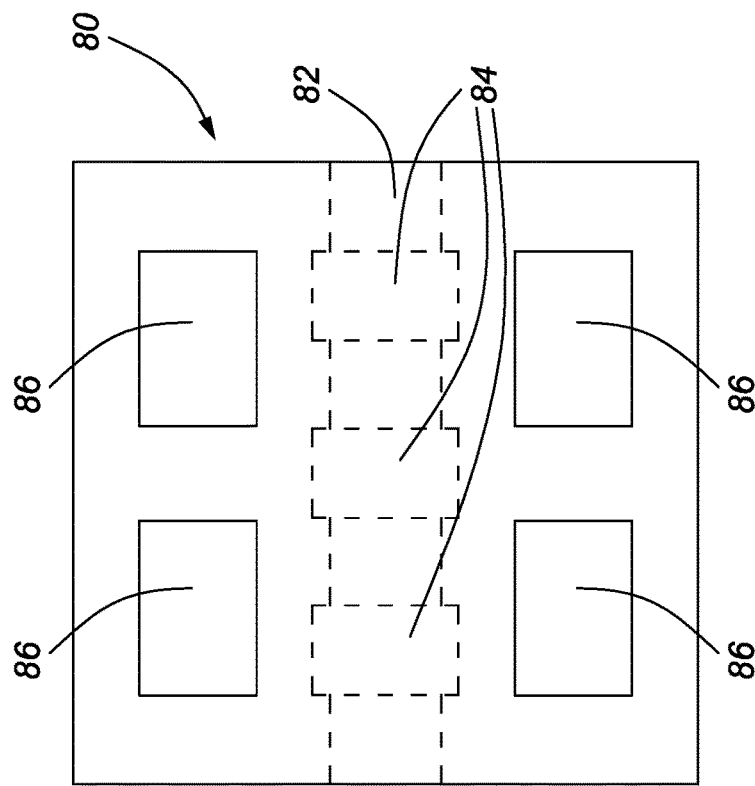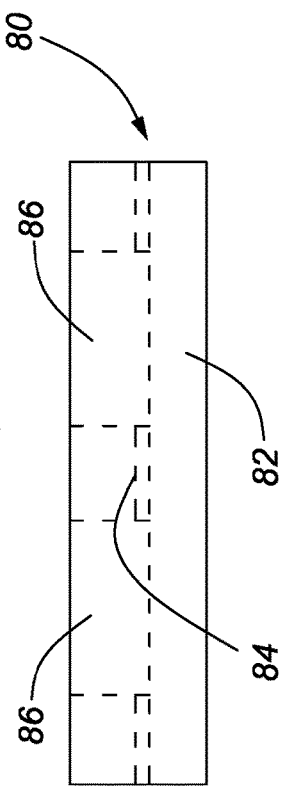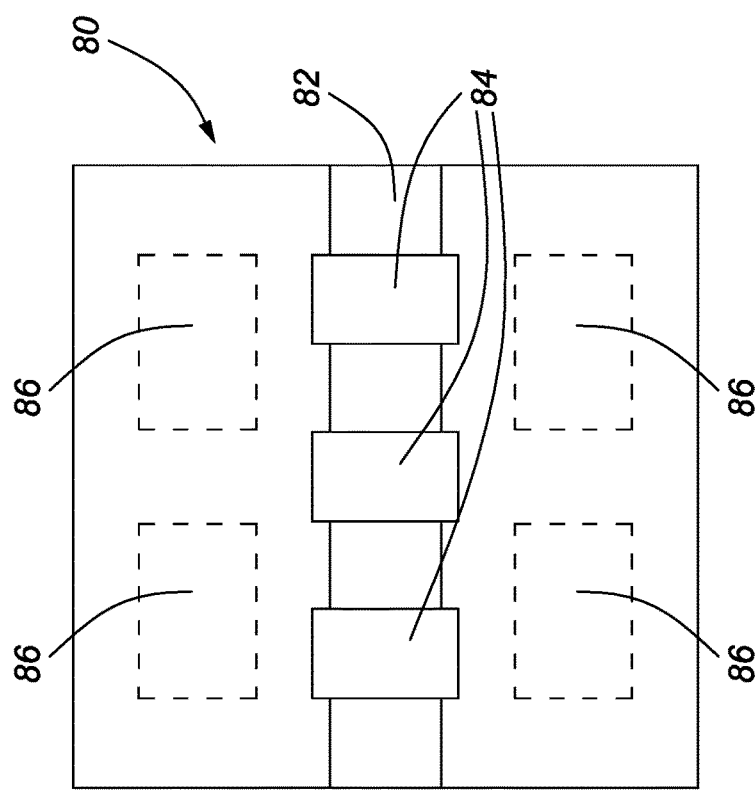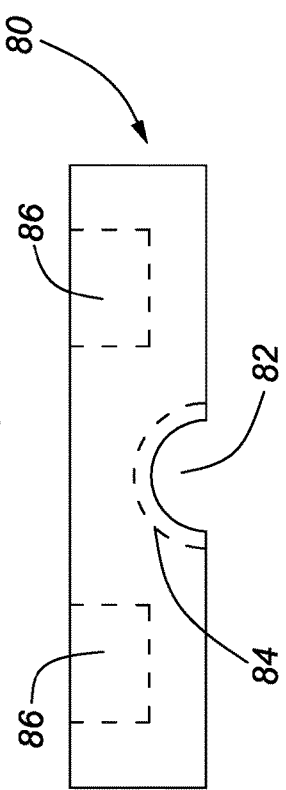

TOOL FOR CLEANING A GRILL

FIELD OF THE INVENTION

The invention relates generally to a product and method for cleaning cooking grills, such as for instance a barbeque, and more particularly to a cleaning tool for cleaning cooking grills without the use of metallic bristles.

BACKGROUND

Grilling is a form of cooking that involves heating food from above and/or below and is especially popular for cooking meat quickly. Charcoal barbeques, gas barbeques (natural gas or propane) and electric barbeques are common examples of appliances that are used for grilling food. In general, cooking grids are arranged above a heat source to provide a surface on which the food is cooked. Typical materials for fabricating the cooking grids include: stainless steel; porcelain-coated cast iron; porcelain-coated steel; cast iron; and chrome-plated steel. Depending on the specific type of grilling appliance, additional heat sources may be provided and/or a cover may be provided to enclose the cooking area.

One problem that is common to all grilling appliances is that grease and particles from the food that is being cooked will accumulate onto the cooking grids. This accumulation becomes charred and hardened and remains on the cooking grids after the food is done cooking. It is desirable to clean the grill and thereby remove the charred and hardened residue prior to the next use of the grilling appliance. This task is complicated due to the physical structure that is typical of cooking grids, which normally include a set of parallel rods or bars with spaces therebetween for allowing the grease and food particles to drip between the rods or bars.

Various solutions have been proposed for cleaning the cooking grids of a grilling appliance. Rigid scrapers fabricated from steel, wood or plastic, either with or without a grooved cleaning edge, can be used to scrape the residues off the upper surface of the cooking grids. Alternatively, wire bristle cleaning brushes are widely used and are highly effective because the bristles are able to spread apart and clean the sides of the rods or bars as well as their upper surfaces. Unfortunately, serious injuries have been known to occur when wire bristles break off the cleaning brush, stick to the cooking grid, and are then ingested along with the food that is subsequently cooked on the cleaned cooking grid. This type of accident may lead to emergency room visits if the wire bristle becomes embedded in the digestive tract of the person consuming the food.

It would therefore be beneficial to provide a product and method for cleaning a grill that overcomes at least some of the above-mentioned disadvantages and/or limitations.

SUMMARY OF THE INVENTION

In accordance with an aspect of at least one embodiment there is provided a grill-cleaning tool, comprising: a water-absorbent layer fabricated from a material that is suitable for transferring a volume of water; and a scrubbing outer layer fabricated from a metallic-mesh material and covering the water-absorbent layer.

Optionally the grill-cleaning tool further comprises a fire-resistant layer disposed outwardly of the water absorbent layer, and the scrubbing outer layer covers both the fire-resistant layer and the water absorbent layer.

In accordance with an aspect of at least one embodiment there is provided a method of cleaning cooking grids of a cooking appliance using a grill-cleaning tool as described above, the method comprising: a) heating the cooking grids to a known cleaning temperature; b) absorbing water into the water-absorbent layer of the grill-cleaning tool; c) pressing the scrubbing outer layer against the heated cooking grids, thereby forcing a portion of the absorbed water out of the water-absorbent layer and into contact with the heated cooking grids so as to generate steam; and d) using a scrubbing motion, mechanically loosening residues adhered to the heated cooking grids.

In an embodiment a grill-cleaning tool includes: an inner layer fabricated from a water-proof material and being generally cylindrical in shape with a closed end and with an open end that is opposite the closed end for receiving the hand and forearm of a user; a water-absorbent layer disposed outwardly of the water-proof inner layer and fabricated from a material that is suitable for transferring a volume of water; a fire-resistant layer disposed outwardly of the water absorbent layer; and a scrubbing outer layer fabricated from a metallic-mesh material.

In an embodiment the fire-resistant layer is omitted.

In an embodiment the water-absorbent layer and the fire-resistant layer are sewn together and are assembled into the grill-cleaning tool as a single unit.

In an embodiment the water-proof inner layer, the water-absorbent layer and the fire-resistant layer are each sized to extend approximately to the user's elbow.

In an embodiment the water-absorbent layer and the fire-resistant layer are also generally cylindrical in shape with a closed end and with an open end that is opposite the closed end for receiving the hand and forearm of a user, and wherein the closed end of each one of the water-proof inner layer, the water-absorbent layer and the fire-resistant layer is larger in the radial direction than the open end of each one of the water-proof inner layer, the water-absorbent layer and the fire-resistant layer.

In an embodiment the grill-cleaning tool includes a plurality of circumferentially spaced-apart ribs extending radially inward from an inner surface of the water-proof inner layer and extending longitudinally along the length of the water-proof inner layer within the larger closed end thereof.

In an embodiment the grill-cleaning tool includes between 4 and 8 circumferentially spaced-apart ribs extending radially inward from an inner surface of the water-proof inner layer and extending longitudinally along the length of the water-proof inner layer within the larger closed end thereof.

In an embodiment each rib is wider at a top portion thereof than at a base portion thereof.

In an embodiment the grill-cleaning tool includes a plurality of fasteners disposed along an outer surface of the water-proof inner layer and a plurality of complementary fasteners disposed along an inner surface of the water-absorbent layer for cooperatively securing the water-absorbent layer to the water-proof inner layer.

In an embodiment the grill-cleaning tool includes a plurality of fasteners disposed along an outer surface of the fire-resistant layer and a plurality of complementary fasteners carried by the scrubbing outer layer for cooperatively securing the scrubbing outer layer to the fire-resistant layer.

In an embodiment the water-proof inner layer is fabricated from heat-resistant silicone rubber.

In an embodiment the scrubbing outer layer is fabricated from food-grade stainless-steel.

BRIEF DESCRIPTION OF THE DRAWINGS

The instant invention will now be described by way of example only, and with reference to the attached drawings, wherein similar reference numerals denote similar elements throughout the several views, and in which:

FIG. 5b is a cross-sectional view taken along line B-B in FIG. 5a.

FIG. 8A is a top exterior view of half of a support block that is used in the embodiment shown in FIGS. 6 and 7.

FIG. 8B is a bottom interior view of the half of the support block of in FIG. 8A.

FIG. 8C is a side view of the half of the support block of FIG. 8A.

FIG. 8D is an end view of the half of the support block of FIG. 8A.

DETAILED DESCRIPTION OF EMBODIMENTS OF THE INVENTION

Figure 1:
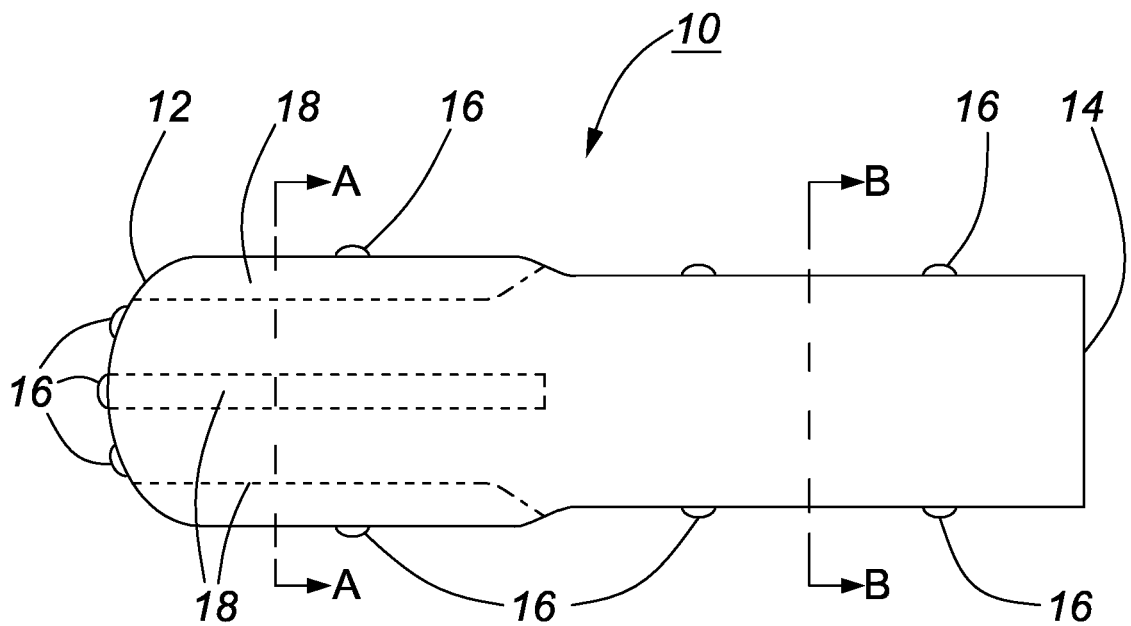
FIG. 1 is a simplified diagram showing a water-proof inner layer of a wearable grill-cleaning tool according to an embodiment.

The following description is presented to enable a person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed but is to be accorded the widest scope consistent with the principles and features disclosed herein. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

In the description and in the claims, the term "inner" is intended to mean closer to the hand of the user (or closer to a handle or a handle mounting structure) relative to another layer. Similarly, the term "outwardly" is intended to mean further away from the hand of the user (or from the handle or the handle mounting structure) relative to another layer.

The term "fire-resistant" is intended to mean resistant to but not wholly proof from the effects of fire or intense heat, and being made from materials that are inherently nonflammable. The specific "fire resistant" material chosen for a particular application may or may not also have a significant heat-insulating property.

The term "metallic-mesh" is intended to mean a material that is fabricated from a plurality of interconnected links of a metal or metal alloy.

A specific and non-limiting example will now be described with reference to FIGS. 1-4, which show a wearable grill-cleaning tool according to an embodiment.

In general, the wearable grill-cleaning tool that is shown in FIGS. 1-4 comprises a plurality of layers, all of which are configured to receive and enclose at least the hand of a user. Optionally, at least some of the layers are configured to further receive and enclose at least the forearm (i.e. up to the elbow joint) of the user. In an embodiment, the wearable grill-cleaning tool is neither left-handed nor right-handed and may be described using the term "sock-shaped" or "tube-shaped." Alternatively, distinct left-handed and right-handed configurations may be fabricated.

In one implementation, the plurality of layers includes: 1) a water-proof inner layer, 2) a water-absorbent layer disposed outwardly of the water-proof inner layer, 3) a fire-resistant layer disposed outwardly of the water-absorbent layer, and 4) an abrasive or scrubbing outer layer, which surrounds the first three inner layers.

In another implementation, the plurality of layers includes: 1) a water-proof inner layer, 2) a water-absorbent and fire-resistant layer disposed outwardly of the water-proof inner layer, and 3) an abrasive or scrubbing outer layer, which surrounds the first two inner layers.

The layers of the plurality of layers are fastened together to form an assembled grill-cleaning tool. The fastenings prevent or minimize relative movement of the layers during use. The fastenings may be disengaged in order to separate the layers one from another, in order to facilitate cleaning, and/or to allow the layers to be replaced at the end of the usable life of each of the respective layers.

Referring specifically to FIG. 1, shown are various features of a water-proof inner layer 10 of the wearable grill-cleaning tool according to an embodiment. The water-proof inner layer 10 is for instance a sock-shaped silicone rubber tube with a relatively larger closed end 12 and a relatively smaller open end 14. A series of protuberances 16 represent fasteners arranged along the outer surface of the silicone tube. Some of the illustrated fasteners are for securing different layers, and the type of fasteners may be either the same or different. One non-limiting example of a suitable fastener is a dome-snap type fastener system. Of course, other suitable fasteners such as for instance a loop-type snap fastener, a strap-and-buckle type fastener, a hook-and-loop type fastener etc. may be used.

As shown using dashed lines, a series of ribs 18, such as raised silicone rubber, are provided along the inner surface at the larger closed end only, to assist with gripping by the user, etc. An example total length between the open and closed end of the water-proof inner layer is about 18 inches. Example diameters for the open and closed ends are about 5.29 inches OD and 6.20 inches OD, respectively. An example thickness of the material of the water-proof inner layer is about 0.1 inch. That being said, optionally a "large" size and a "small" size is envisioned in order to accommodate different users having different sized hands.

Figure 1A:
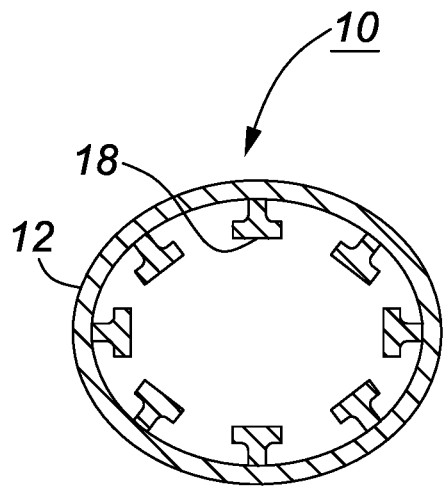
FIG. 1a is a cross-sectional view taken along line A-A in FIG. 1.
Figure 1B:
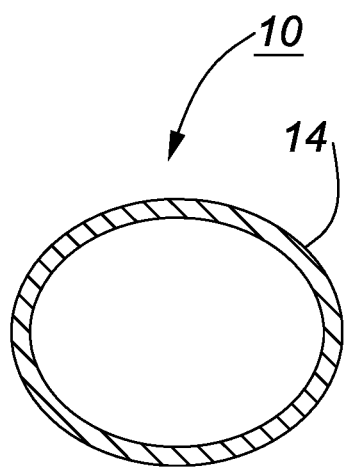
FIG. 1b is a cross-sectional view taken along line B-B in FIG. 1.

FIG. 1a shows a cross-sectional view of the relatively larger closed end 12 taken along line A-A, and FIG. 1b shows a cross-sectional view of the relatively smaller open end 14 taken along line B-B. The ribs 18 shown in FIG. 1a are, by way of example, approximately 1 inch tall and approximately 1 inch wide at the tops thereof, but only about 0.25 inches wide at the bases thereof, and thus the ribs 18 are generally "T-shaped." In this specific example, the ribs 18 are approximately 5 inches in length. The number of ribs 18 may be varied, but in this specific example 8 ribs are shown. Alternatively, between 4 and 8 ribs are provided.

Figure 2:
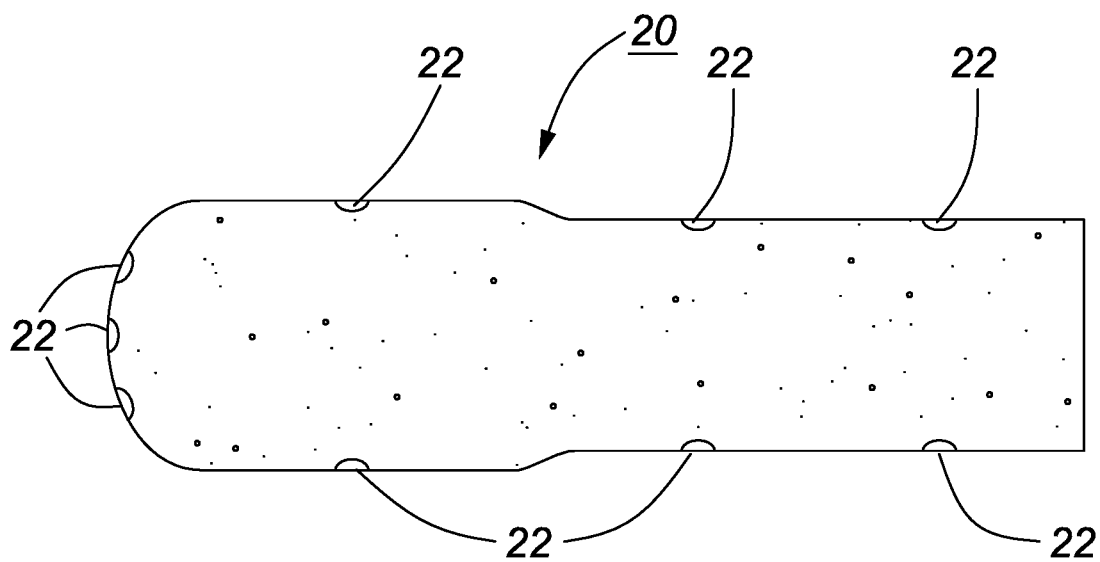
FIG. 2 is a simplified diagram showing a water-absorbent layer of a wearable grill-cleaning tool according to an embodiment.
Figure 3:
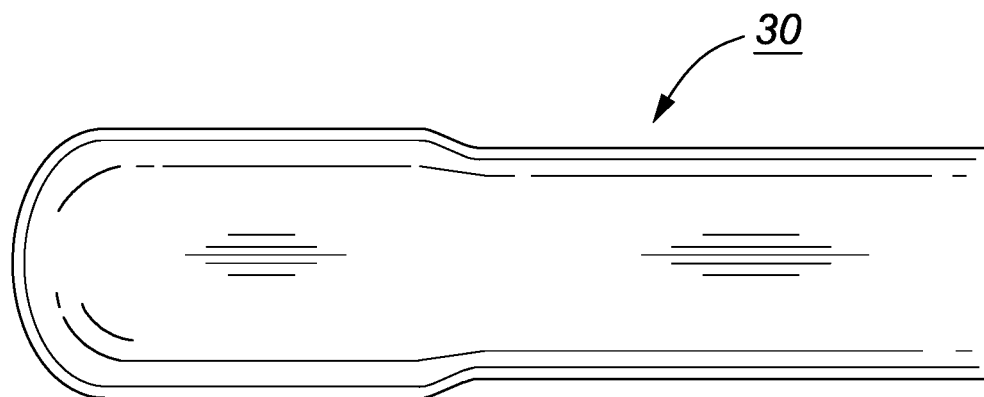
FIG. 3 is a simplified diagram showing a fire-resistant layer of a wearable grill-cleaning tool according to an embodiment.

FIG. 2 illustrates various features of the water-absorbent layer 20 of the wearable grill-cleaning tool, and FIG. 3 illustrates various features of the fire-resistant layer 30 of the wearable grill-cleaning tool. These two layers may be sewn together or otherwise incorporated into a single (compound) layer (not illustrated), which can then be assembled as a unit into the wearable grill-cleaning tool. Alternatively, additional fasteners 22 may be carried on the outer surface of the water-absorbent layer 20 and on the inner surface (not illustrated) of the fire-resistant layer 30, such that the two layers may be assembled separately into the wearable grill-cleaning tool. In this specific and non-limiting example, both the water-absorbent layer 20 and the fire-resistant layer 30 have a closed end and an open end, which are complementary to the closed end 12 and open end 14 of the water-proof inner layer 10. Since the various layers of the wearable grill-cleaning tool are assembled one onto another, each outwardly disposed layer is sized to accommodate the respective inner layers. Example diameters for the open and closed ends of the water-absorbent layer 20 are about 5.79 inches OD and 6.70 inches OD, respectively and for the fire-resistant layer 30 are about 6.05 inches OD and 6.96 inches OD, respectively.

Figure 4:
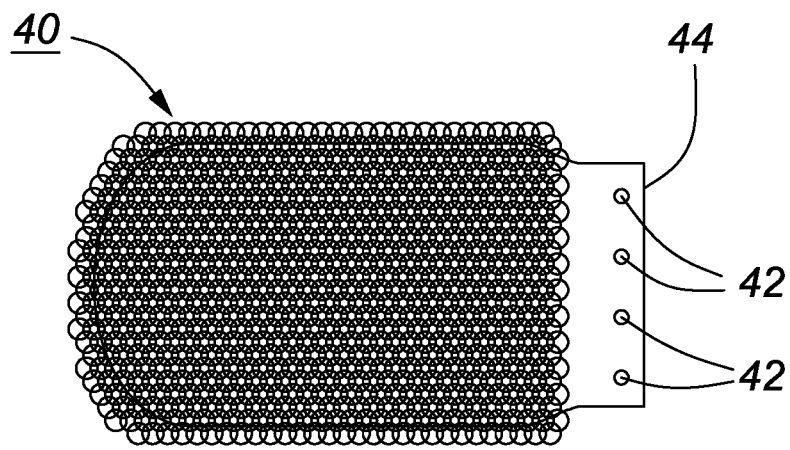
FIG. 4 is a simplified diagram showing an abrasive or scrubbing outer layer of a wearable grill-cleaning tool according to an embodiment.

FIG. 4 illustrates various features of the abrasive or scrubbing outer layer 40 of the wearable grill-cleaning tool according to an embodiment. The outer layer 40 is for instance a metallic-mesh (chain mail-like) material fabricated from stainless steel links each of a few millimeters in size. Optionally, another suitable metal or a suitable metal alloy is used to fabricate metallic-mesh of the outer layer 40. Fasteners 42 are provided at an open end 44 of the outer layer 40. In an embodiment, the fasteners 42 secure directly to the fasteners 16 near the open end 14 of the water-proof inner layer 10.

As is apparent, in this example the abrasive or scrubbing outer layer 40 is relatively shorter than any of the inner layers, and in particular extends only to about the user's wrist. Example diameters for the open and closed ends are about 6.20 inches OD and 7.11 inches OD, respectively.

When the grill-cleaning tool is intended to be worn by a user, the layers are closed at one end and open at the opposite end for receiving the hand and fore-arm of the user, much in the same way a sock receives a foot and part of the calf of a wearer. Optionally, at least some of the layers are not closed at the one end. By way of a non-limiting example, the abrasive or scrubbing layer may be provided in the form of a band that is open at both ends, or in the form of a patch that is carried along only part of the circumference of the wearable grill-cleaning tool. For safety reasons and to improve the user's comfort, other layers should be closed at the one end (e.g., the water-proof inner layer and the fire-resistant layer or water-absorbent and fire-resistant layer). The length that is selected for each layer depends for instance safety considerations and cost. The water-absorbent and fire-resistant layers may extend to the user's elbow in order to protect the user's forearm from heat and steam coming off the grill cooking surface, whilst the abrasive or scrubbing layer may extend only the length of the user's hand since material past the user's wrist would not be used to clean the grill cooking surface.

Some additional features of each of the individual layers are listed below:

Water-Proof Inner Layer 10:
May be a tube with a larger end (Closed) and a smaller end (opened).
May include internal ribs in the larger end to assist the user in establishing a firm grip to perform the scrubbing motion and apply pressure in the cleaning process.
May carry a fastener system to fasten the water-absorbent or water-absorbent and fire-resistant layer outwardly thereof.
Provide a water proof membrane between the user and the water-absorbent or water-absorbent and fire-resistant layer.
Protects the user's hand and forearm up to about the user's elbow from direct heat from the grilling appliance and the steam that is evolved during cleaning.
An example material is a heat resistant silicon rubber material.

Water-Absorbent Layer 20 and Fire-Resistant Layer 30:
Store water in the fibers of a water-absorbent cloth material.
Fire-resistant material is disposed outwardly of the cloth material, which is the case regardless of whether the water-absorbent layer and the fire-resistant layer are separate or integrated into a single dual-function layer.
Carries a first fastener system along an inner surface thereof for mating with the fastener system of the water-proof layer.
Carries a second fastener system along an outer surface thereof to fasten the abrasive or scrubbing layer outwardly thereof.
Some specific and non-limiting examples of materials that may be used in the fabrication of the water-absorbent and/or fire-resistant layer(s) include at least the following:
Nomex® Fabric—by Dupont™
Westex®—by Milliken
Kovenex™ Fabrics—by Kovenex™

Abrasive or Scrubbing Layer 40:
Provides the ability to scrub the cooking grids, to scrape off the residue (grease, food, dirt and debris) from previous activity usage of the grill.
Material to be a metal or metallic alloy e.g., stainless steel and food grade. Alternatively, a natural material is used to form the abrasive or scrubbing layer, such as for instance a piece of leather having a plurality of perforations to resemble a piece of honeycomb. The piece of leather hardens after multiple cleaning cycles and forms sharp edges capable of removing the steam-loosened debris from the grill surface.

Figure 5:
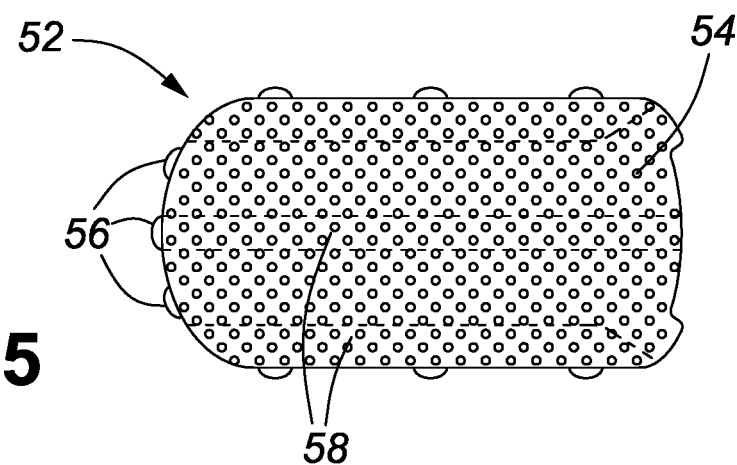
FIG. 5 is a simplified diagram showing a grill-cleaning tool head according to another embodiment.

Another specific and non-limiting example will now be described with reference to FIGS. 5, 5a and 5b, which shows a generally cup-shaped grill-cleaning tool head 50 with a handle 60.

Figure 5A:
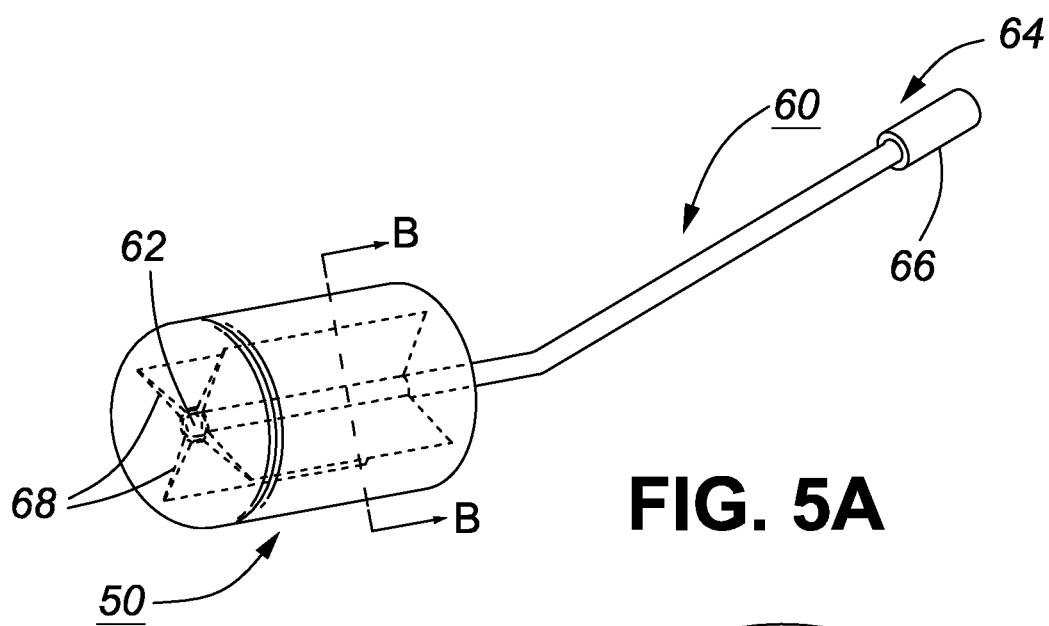
FIG. 5a shows the grill-cleaning tool head of FIG. 5 assembled onto a handle.
Figure 5B:
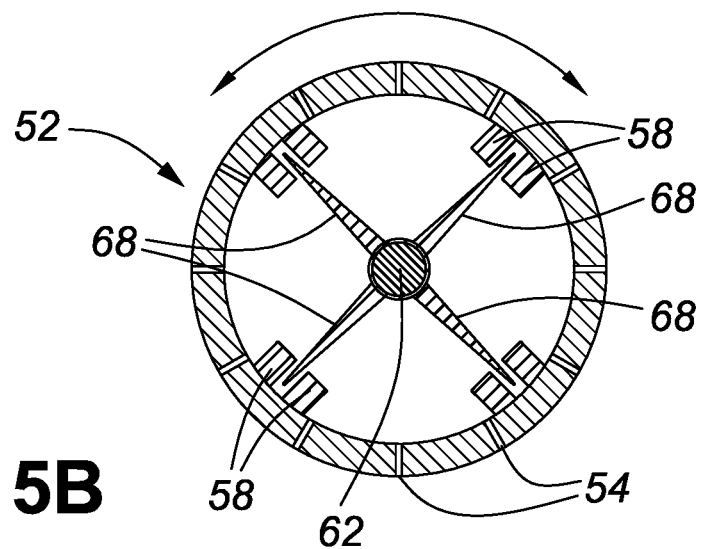

In general, the grill-cleaning tool head 50 that is shown in an assembled condition in FIG. 5a comprises a plurality of layers, all of which are configured to receive and enclose a first end 62 of the handle 60, which also has a second end 64 that may be grasped by a user for cleaning a grill with the grill-cleaning tool. The grill-cleaning tool head 50 is depicted in a highly simplified way in FIG. 5A, in the form of a transparent cylinder, so as to avoid obscuring details of the connection to the first end 62 of the handle 60. The handle 60 is optionally fabricated from a plastic, wood or metallic material, or combinations thereof, and is fixedly secured at the first end 62 thereof to the grill-cleaning tool. The handle has a grasping feature 66 at the second end 64 thereof opposite the first end 62. The handle 60 has a length that is sufficient to allow the user to clean a grill with the grill-cleaning tool and without placing his or her hand too close to the grill, such as for instance between 24 and 36 inches, most preferably about 30 inches.

FIG. 5 shows, in isolation, the innermost layer of the grill-cleaning tool head 50, which in this example is a silicone rubber inner support layer 52. The inner support layer 52 is generally cup-shaped, is deformable by application of pressure, and has a plurality of perforations 54 extending between an inner surface and an outer surface thereof for allowing fluid to flow therethrough. The inner support layer 52 supports a plurality of outwardly disposed layers (not illustrated), which layers are similar to the water-absorbent layer 20, the fire-resistant layer 30 and the scrubbing outer layer 40 described above. A plurality of fasteners 56 is illustrated along the outer surface of the inner support layer 52 for mating with complementary fasteners carried by one or more of the outwardly-disposed layers (not illustrated). The fasteners 56 prevent or minimize relative movement of the various layers during use. The fasteners 56 may be disengaged in order to separate the layers one from another, in order to facilitate cleaning, and/or to allow the layers to be replaced at the end of the usable life of each of the respective layers.

In the specific example that is shown in FIG. 5, the generally cup-shaped inner support layer 52 may become filled with water when the grill-cleaning tool is immersed in a container of water, and the water may subsequently drain out through the plurality of perforations to thereby thoroughly soak the adjacent water absorbent layer and to also control the amount of water that is transferred to the grill appliance being cleaned. Alternatively, the inner support layer 52 may be fabricated in the form of a closed cylindrical shaped body, which merely supports the outwardly disposed layers and does not become filled with water.

Referring again to FIG. 5a, the elongated handle 60 is mounted at the first end 62 thereof to the inner support layer 52. In the specific and non-limiting example that is shown in FIG. 5a, the inner support layer 52 is substantially similar to the large end 12 of the water-proof inner layer 10 shown in FIG. 1, and the inner surface of the inner support layer 52 includes a plurality of raised ribs 58 extending along the inner surface in the longitudinal direction. Referring also to FIG. 5b, a plurality of wings or fingers 68 extending from the first end 62 of the handle 60 engage between adjacent ribs 58 to secure the inner support layer 52 to the first end 62 of the handle 60. Alternatively, another suitable mounting arrangement is used, such as for instance molding the inner support layer with an integrally formed extension that forms at least a portion of the handle or molding the inner support layer 52 with an integrally formed mounting feature for engaging a complementary mounting feature disposed at the first end of the elongated handle.

Some additional features of each of the individual layers are listed below:

Inner Support Layer:
May be a tube with similarly dimensioned closed and open ends, forming a substantially cup-shaped structure.
May include internal ribs for engaging wings or fingers extending from a first end of an elongated handle.
May carry a fastener system to fasten the water-absorbent or water-absorbent and fire-resistant layer outwardly thereof.
May have a plurality of perforations for allowing liquid to pass between inner and outer sides of the inner support layer.
May be fabricated as a closed, hollow cylindrical-shaped body or as a solid cylindrical-shaped body.
An example material is a heat resistant silicon rubber material or a rigid or semi-rigid plastic.

Water-Absorbent and Fire-Resistant Layer:
Stores water in the fibers of a cloth material.
A fire-resistant material is disposed outwardly of the cloth material, which is the case regardless of whether the water-absorbent layer and the fire-resistant layer are separate or integrated into a single dual-function layer.
Carries a first fastener system along an inner surface thereof for mating with the carrier system of the inner support layer.
Carries a second fastener system along an outer surface thereof to fasten the abrasive or scrubbing layer outwardly thereof.
Some specific and non-limiting examples of materials that may be used in the fabrication of the water-absorbent and/or fire-resistant layer(s) include at least the following:
Nomex® Fabric by Dupont™
Westex®—by Milliken
Kovenex™ Fabrics—by Kovenex™

Abrasive or Scrubbing Layer:
Provides the ability to scrub the cooking grids, to scrape off the residue (grease, food, dirt and debris) from previous activity usage of the grill.
Material to be a metal or metallic alloy e.g., stainless steel and food grade. Alternatively, a natural material is used to form the abrasive or scrubbing layer, such as for instance a piece of leather having a plurality of perforations to resemble a piece of honeycomb. The piece of leather hardens after multiple cleaning cycles and forms sharp edges capable of removing the steam-loosened debris from the grill surface.

Figure 6:
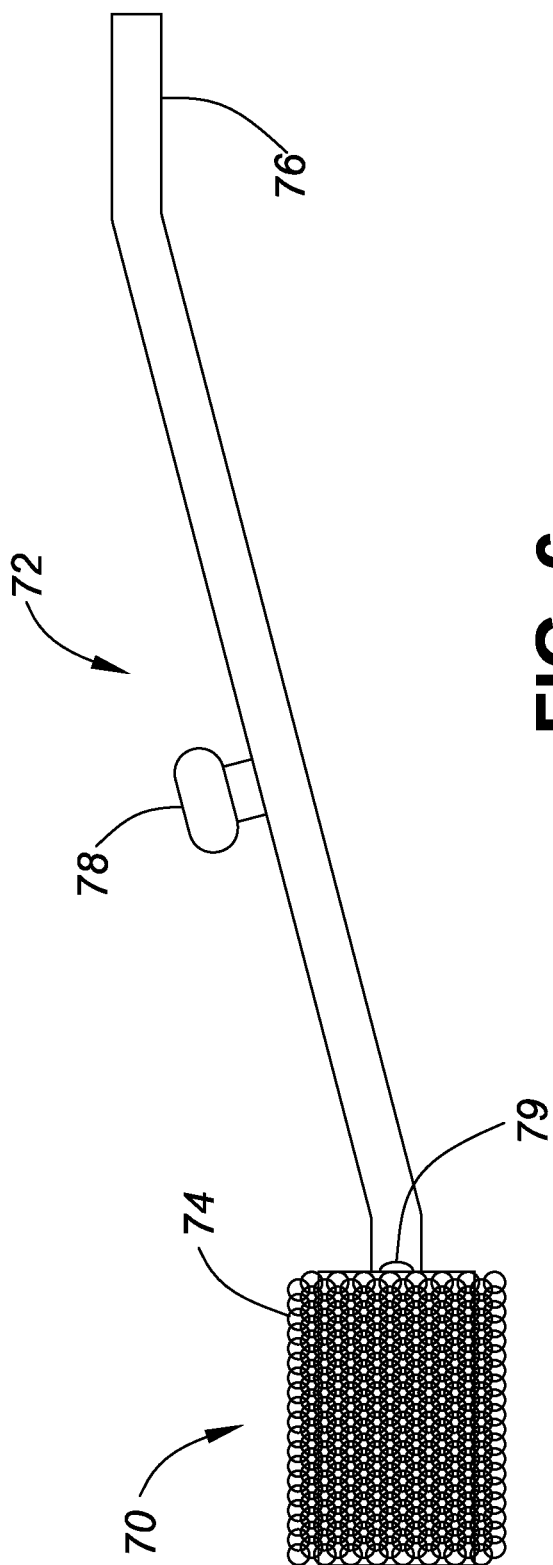
FIG. 6 is a simplified side view showing a grill-cleaning tool head according to another embodiment assembled onto a handle.

Referring now to FIG. 6 shown is a simplified side view of an alternative configuration of the grill-cleaning tool head and an associated mounting arrangement. In the specific and non-limiting example that is shown in FIG. 6, a grill-cleaning tool head 70 is shown assembled onto a handle 72. The various layers as described above, i.e., an inner support layer, a water-absorbent and fire-resistant layer disposed outwardly of the inner support layer, and an abrasive or scrubbing outer layer, which surrounds the first two inner layers, are shown generally at 74 assembled onto a not shown support block. The handle 72 optionally includes a gripping feature 76 at an end opposite the grill-cleaning tool head 70, and/or a gripping knob or similar structure 78 approximately half-way along the length of the handle 72. Mechanical fasteners, such as for instance dome snaps 79, are provided on the layers 74 for securing the layers 74 onto the not shown support block. Suitable dimensions are for example a handle length of approximately 30 inches with the optional gripping knob 78 disposed approximately 15 inches from the gripping end of the handle 72. The support block plus the various layers may have an approximate total thickness of approximately 3.75 inches.

Figure 7:
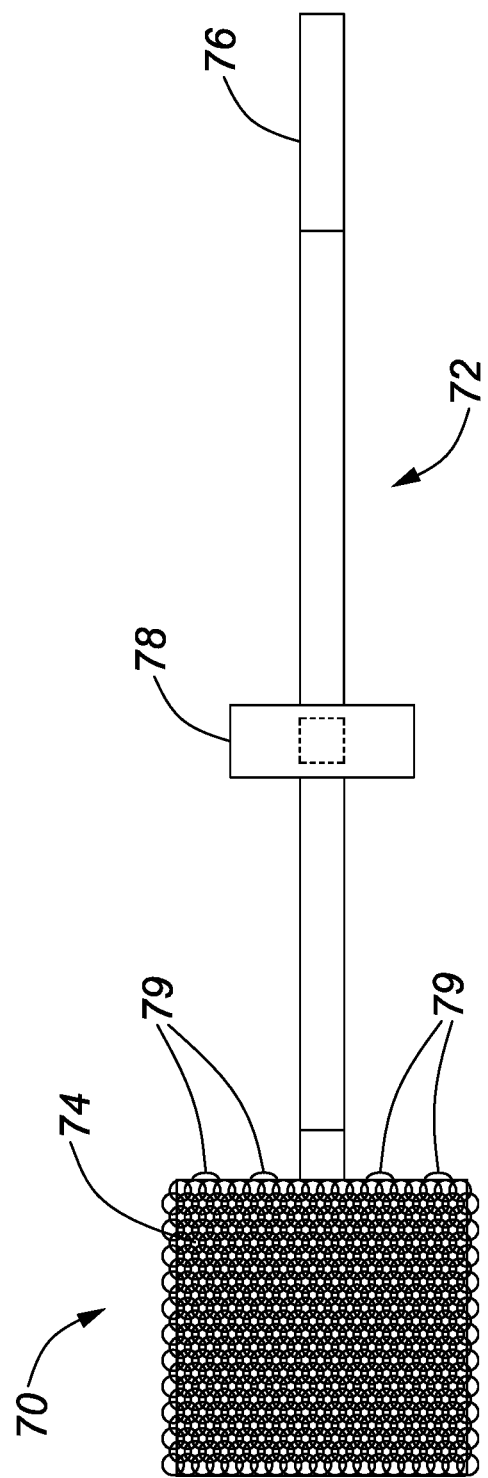
FIG. 7 is a simplified top view showing the grill-cleaning tool head and handle of FIG. 6.

FIG. 7 is a simplified top view of the embodiment that is shown in FIG. 6. By way of a specific and non-limiting example, the support block plus the various layers may have an approximate size of 6 inches long by 6.75 inches wide.

Referring now to FIGS. 8A-D, shown is a support block 80 suitable for use with the embodiment shown in FIGS. 6 and 7. FIG. 8A is a view of the outside of the support block 80, FIG. 8B is a view of the inside of the support block 80, FIG. 8C is a side view of the support block 80, and FIG. 8D is an end view of the support block 80. The support block has a central channel 82 with at least one recess 84 disposed along the length of the channel 82. As is shown in FIG. 8D, the channel 82 is circular in the end view and the at least one recess 84 is a region having a larger diameter relative to the rest of the channel 82. In the specific example that is shown in FIGS. 8A-D there are three recesses 84. In an assembled condition, a corresponding at least one ring-shaped region projecting from handle 72 is seated within the at least one recess 84. The support block 80 is rotatable about the handle 72, and the interlocking at least one recess and not illustrated at least one ring-shaped region projecting from the handle 72 limit movement of the support block 80 in a direction along the length of the handle 72. Additionally, and optionally, recessed compartments 86 for retaining small volumes of water are formed in the outer surface of the support block 80, as shown in FIG. 8A and using ghost-lines in FIG. 8B.

Figure 9:
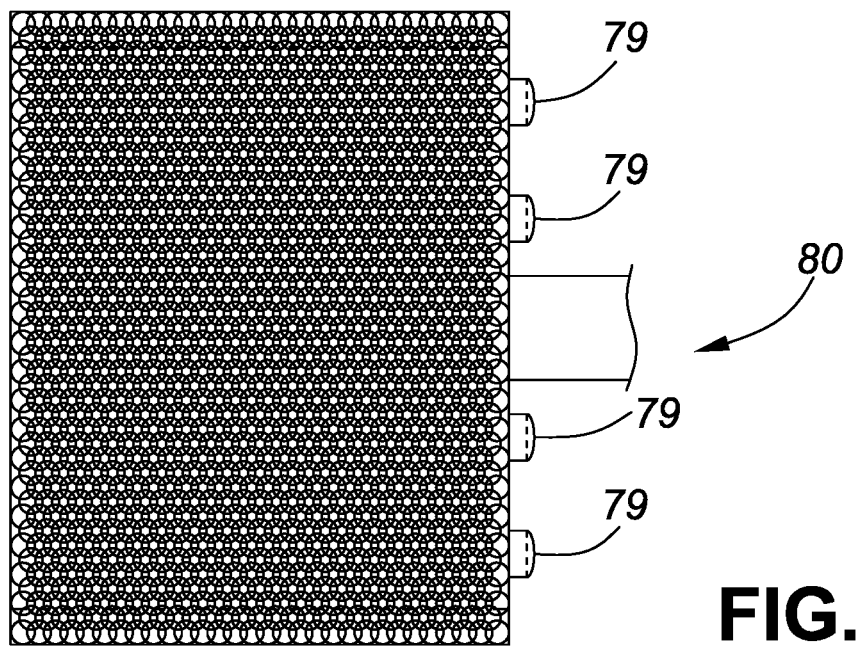
FIG. 9 is a top view of a support block that is used in the embodiment shown in FIGS. 6 and 7 with a plurality of grill-cleaning layers assembled thereto.
Figure 9A:
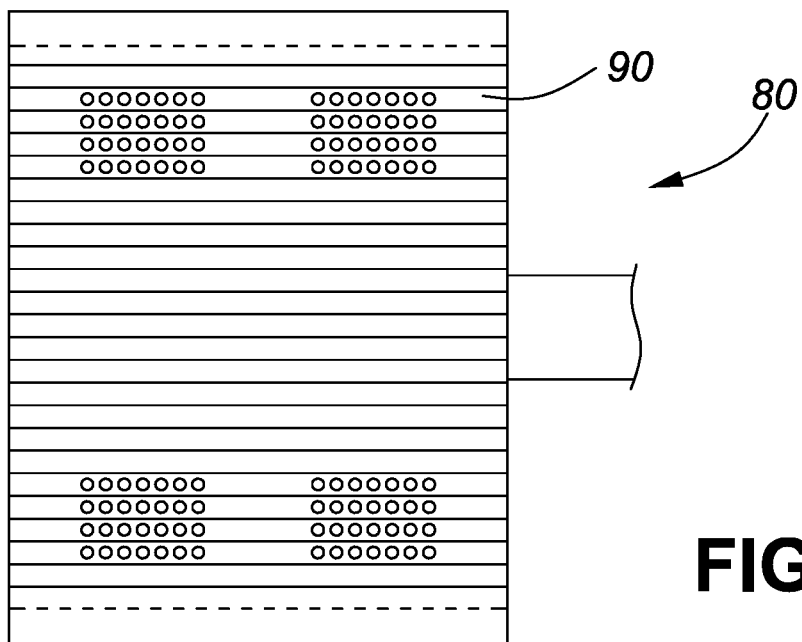
FIG. 9A is a top view of a support block that is used in the embodiment shown in FIGS. 6 and 7 and with a deformable and grooved inner support layer.
Figure 9B:
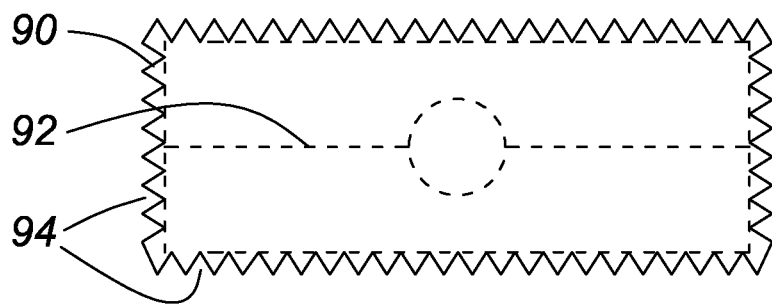
FIG. 9B is an end view of the support block of FIG. 9A.

Referring now to FIG. 9, shown is a top view of the support block 80 with the inner support layer, the water-absorbent and fire-resistant layer, and the abrasive or scrubbing outer layer supported thereon and secured using mechanical fasteners 79 carried by the outer layer. Various configurations may be employed for the various layers, and different layers may be configured differently. For instance, the inner support layer may be omitted, or it may be formed integrally with the support block 80 as a deformable layer 90 molded thereto as shown in FIGS. 9A and 9B. The water absorbent and fire-proof layers preferably are sock-shaped and extend over the end of the support block opposite the handle 72 so as to protect the material of the support block from heat produced by the grill being cleaned. On the other hand, the abrasive or scrubbing outer layer may be formed as a band that covers the top, bottom and opposite sides but not the end of the support block 80. Alternatively, the abrasive or scrubbing outer layer may also cover the end of the support block 80 to provide additional scrubbing area on the grill-cleaning tool head. In the embodiment shown in FIGS. 8A-8D, preferably the inner support layer is formed with a plurality of perforations to support outward movement of trapped water from the recessed compartments 86 to the water absorbent and fire-proof layers.

Referring specifically to FIGS. 9a and 9b, the inner support layer is either molded directly on the support block 80 or it is formed as a semi-rigid removable casing provided with an access slot 92 through which the support block 80 is inserted. In both cases, the inner support layer preferably is formed with a series of outwardly facing grooves 94 which are deformable when pressed against the surface of the grill that is being cleaned. The grooves 94 allow the grill-cleaning tool reach below the upper surface of the grill that is being cleaned, trapping steam against the grill surface and thereby removing additional debris compared to a flat and non-deformable cleaning tool surface. Advantageously, the mechanical fasteners 79 may be released and the water-absorbent and fireproof layers, as well as the scrubbing outer layer may be removed from the support block and waterproof inner layer and may be cleaned after several uses or even after a single use.

Some additional features of each of the individual layers are listed below:

Inner Support Layer:
May be formed as a removable casing with an access slot for receiving a support block.
May be formed integrally with a support block.
May have a plurality of perforations for allowing liquid to pass between inner and outer sides thereof.
An example material is a heat resistant silicon rubber material or a rigid or semi-rigid plastic.

Water-Absorbent and Fire-Resistant Layer:
Stores water in the fibers of a cloth material.
A fire-resistant material is disposed outwardly of the cloth material, which is the case regardless of whether the water-absorbent layer and the fire-resistant layer are separate or integrated into a single dual-function layer.
Some specific and non-limiting examples of materials that may be used in the fabrication of the water-absorbent and/or fire-resistant layer(s) include at least the following:
Nomex® Fabric—by Dupont™
Westex®—by Milliken
Kovenex™ Fabrics—by Kovenex™

Abrasive or Scrubbing Layer:
Provides the ability to scrub the cooking grids, to scrape off the residue (grease, food, dirt and debris) from previous activity usage of the grill.
Material to be a metal or metallic alloy e.g., stainless steel and food grade. Alternatively, a natural material is used to form the abrasive or scrubbing layer, such as for instance a piece of leather having a plurality of perforations to resemble a piece of honeycomb. The piece of leather hardens after multiple cleaning cycles and forms sharp edges capable of removing the steam-loosened debris from the grill surface.

Another specific and non-limiting example will now be described with reference to FIGS. 10-11, which shows a grill-cleaning tool in the form of a pad with a handle.

Figure 10:
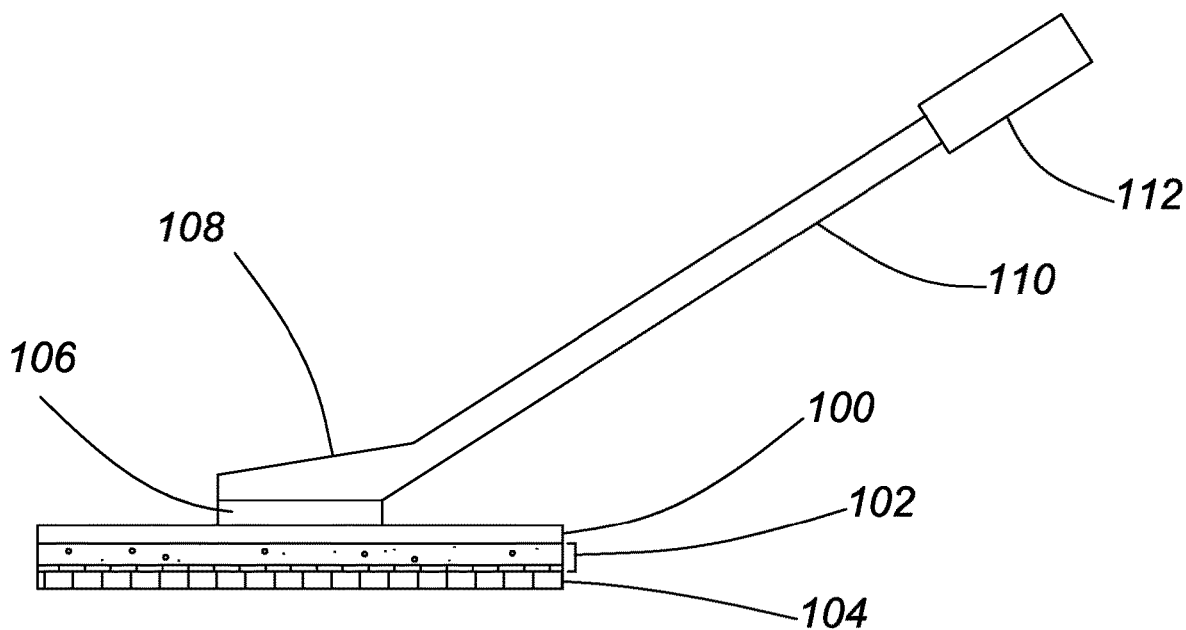
FIG. 10 is a simplified diagram showing a grill-cleaning tool according to yet another embodiment.
Figure 11:
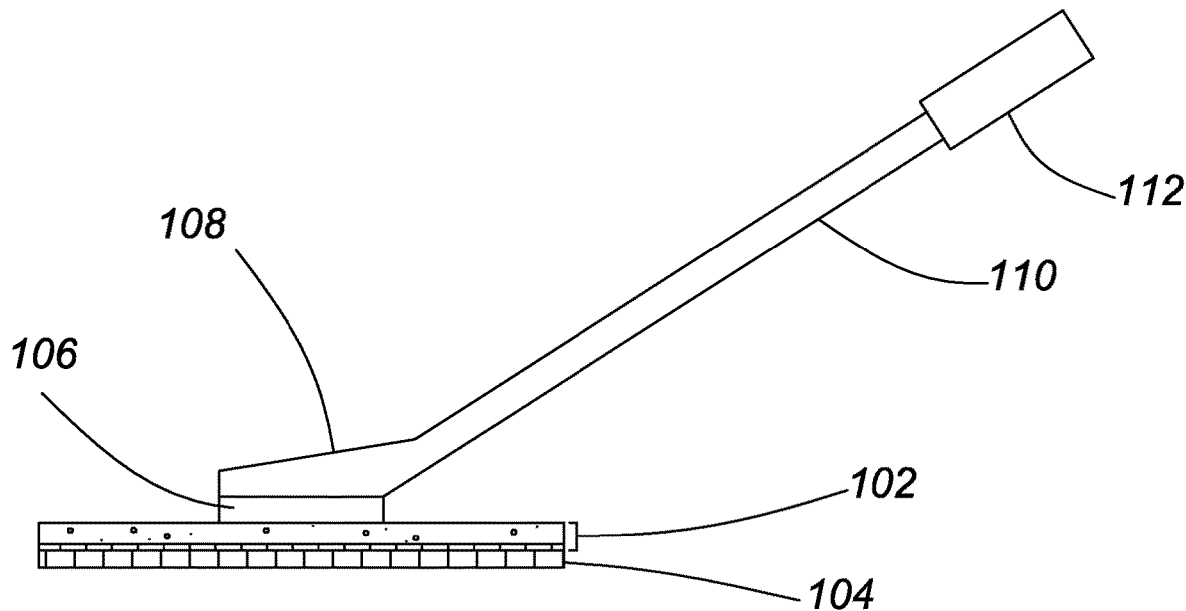
FIG. 11 is a simplified diagram showing a grill-cleaning tool according to yet another embodiment.

In general, the grill-cleaning tools shown in FIGS. 10-11 comprise a plurality of layers assembled together to form a pad of sorts which has an upper side that faces away from the cooking grids during use. An elongated handle extending away from the upper side is provided for being grasped by a user during cleaning of a grill with the grill-cleaning tool. For instance, the upper side of the grill leaning tool carries a complementary mounting structure for detachably receiving a mounting structure disposed at a first end of the handle, and the handle having a grasping feature disposed at a second end thereof for being grasped by the user. Although not shown in FIGS. 10-11, optionally a gripping feature similar to knob 76 is provided along the handle.

The layers of the plurality of layers are fastened together to form an assembled grill-cleaning tool. The fastenings carried by the various layers prevent or minimize relative movement of the layers during use. The fastenings may be disengaged in order to separate the layers one from another, in order to facilitate cleaning, and/or to allow the layers to be replaced at the end of the usable life of each of the respective layers.

As shown in FIG. 10, the grill-cleaning tool includes a backing layer 100, which is for instance a rigid plastic layer that provides backing support for the other layers that are disposed outwardly of the backing layer. A combined water-absorbent and fire-resistant layer 102 is fastened adjacent to the backing layer, and finally an abrasive or scrubbing layer 104 is disposed adjacent to the layer 102. Optionally, the combined water-absorbent layer and fire-resistant layer 102 is provided as separate not illustrated water-absorbent and fire-resistant layers. A complementary mounting structure 106 is integrally formed with, i.e. by molding, or otherwise joined using an adhesive or other means, to the backing layer 100. A mounting structure 108 that is carried at a first end of a handle shaft 110 engages and is fixedly secured to the complementary mounting structure 106. Optionally, a grasping feature 112 is provided at a second end of the handle shaft 110 that is opposite the first end.

As shown in FIG. 11, optionally a separate backing layer is omitted and the complementary mounting structure 106 is mounted to or otherwise integrated into the combined water-absorbent and fire-resistant layer 102.

Some additional features of each of the individual layers are listed below:

Backing Support Layer:
Fabricated from a rigid or semi-rigid material, such as for instance a plastic or metal or metal alloy material.
Carries a fastener system to fasten the water-absorbent or water-absorbent and fire-resistant layer outwardly thereof.
May carry a complementary mounting structure for detachably engaging a mounting structure disposed at a first end of an elongated handle or may be molded or otherwise integrated with the first end of the elongated handle.
Distributes a pressing force that is applied via the handle during cleaning a grill to the entire cleaning area of the grill-cleaning tool.

Water-Absorbent and Fire-Resistant Layer:
Stores water in the fibers of a cloth material.
A fire-resistant material is disposed outwardly of the cloth material, which is the case regardless of whether the water-absorbent layer and the fire-resistant layer are separate or integrated into a single dual-function layer.
Carries a first fastener system along an inner surface thereof for mating with the carrier system of the inner support layer.
Carries a second fastener system along an outer surface thereof to fasten the abrasive or scrubbing layer outwardly thereof.
Some specific and non-limiting examples of materials that may be used in the fabrication of the water-absorbent and/or fire-resistant layer(s) include at least the following:
Nomex® Fabric—by Dupont™
Westex®—by Milliken
Kovenex™ Fabrics—by Kovenex™

Abrasive or Scrubbing Layer:
Provides the ability to scrub the cooking grids, to scrape off the residue (grease, food, dirt and debris) from previous activity usage of the grill.
Material to be a metal or metallic alloy e.g., stainless steel and food grade. Alternatively, a natural material is used to form the abrasive or scrubbing layer, such as for instance a piece of leather having a plurality of perforations to resemble a piece of honeycomb. The piece of leather hardens after multiple cleaning cycles and forms sharp edges capable of removing the steam-loosened debris from the grill surface.

A method of cleaning the cooking grids of a grill appliance, using a grill-cleaning tool according to an embodiment, will now be described.

Cleaning is performed when the cooking grids are hot, e.g. after the grilling appliance has been pre-heated to the desired cooking temperature, typically 350-450° F. The user immerses the grill-cleaning tool in a container of water or runs water onto the grill-cleaning tool from a hose or faucet. The water-absorbent material holds water until the user presses the grill-cleaning tool against the hot cooking grids, which forces some of the water into contact with the hot cooking grids and thereby producing steam to assist in the cleaning action. The user moves the grill-cleaning tool while still in contact with the hot cooking grids, using a scrubbing motion, such that the abrasive or scrubbing outer layer dislodges the residue from the hot cooking grids. Removal of the residue is facilitated by the combination of heat and water/steam, which softens the residue making it easier to dislodge. When the scrubbing surface of the grill-cleaning tool becomes fouled with the residue and cleaning efficiency decreases, the user may rotate the grill-cleaning tool (except for the embodiments shown in FIGS. 10-11) to expose a fresh scrubbing surface. The user may continue to rotate the grill-cleaning tool until no fresh scrubbing surface remains, after which the grill-cleaning tool may be cleaned by immersion into fresh water etc. The grill-cleaning tool may be re-immersed in fresh water as many times as is required to completely clean the cooking grids.

When the grill-cleaning tool is worn by the user, the user's hand is protected by the water-proof layer and the fire-resistant layer, as well as the volume of water that is held in the water-absorbent layer. Since a large volume of hot steam may be produced, preferably at least the fire-resistant layer extends along the user's forearm to prevent scalding and burns due to the evolved steam.

When the grill-cleaning tool is mounted on a handle, the handle is sufficiently long such that the user does not place his or her hand close enough to the grill to be burned or scalded by the heat coming directly off the grill or by the evolved steam.

After use, the grill-cleaning tool can be disassembled and cleaned for the next time usage. Different cleaning procedures are suitable for the different layers. For instance, the abrasive or scrubbing outer layer, which may be fabricated from stainless steel mesh, may be cleaned in a dishwasher or using common dish soap. The water-absorbent layer and fire-resistant layer, either as a single layer or as two separate layers, may be cleaned in a laundry machine. The water-proof inner layer may be wiped down with a damp cloth.

In each embodiment described above, optionally the fire-resistant layer is omitted. Although less preferred, the water-absorbent layer carries a volume of water that is sufficient to prevent the inner layers (i.e., the water-proof layer or inner support layer) from burning even during exposure to the relatively high temperatures that are produced by a grill-cooking appliance. The combination of the water-absorbent layer (which carries water that is converted to a cleaning steam when brought into contact with the hot surface of a grill-cleaning appliance) and the abrasive or scrubbing layer (which mechanically removes debris that is loosened by the cleaning steam) is sufficient to provide the improved grill-cleaning properties that are described above. The water-proof layer and/or inner support layer and/or fire-resistant layer may be included depending on the particular implantation and/or the level of safety and/or personal protection that is desired.

The foregoing description of methods and embodiments of the invention has been presented for purposes of illustration. It is not intended to be exhaustive or to limit the invention to the precise steps and/or forms disclosed, and many modifications and variations are possible in light of the above teaching. It is intended that the scope of the invention and all equivalents be defined by the claims appended hereto.

What is claimed is:

1. A grill-cleaning tool, comprising:
a water-absorbent layer fabricated from a material that is suitable for transferring a volume of water;
a scrubbing outer layer fabricated from a metallic-mesh material and covering the water-absorbent layer;
a fire-resistant layer disposed outwardly of the water-absorbent layer, wherein the scrubbing outer layer covers both the fire-resistant layer and the water-absorbent layer; and
an inner support layer disposed inwardly of the water-absorbent layer, the fire-resistant layer and the scrubbing outer layer, and wherein the inner support layer is operatively coupled to an elongated handle having a grasping end that is spaced away from the inner support layer,
wherein the inner support layer is a generally cup-shaped structure with an open end, wherein an end of the elongated handle opposite the grasping end extends through the open end and into an interior cavity of the inner support layer, and wherein a wall material of the inner support layer comprises a plurality of perforations configured to support movement of liquid into and out of the interior cavity of the inner support layer.

2. The grill-cleaning tool of claim 1, comprising a mounting feature carried by the inner support layer within the interior cavity thereof, and wherein the elongated handle comprises a complementary mounting feature disposed at a first end for engaging the mounting feature.

3. A grill-cleaning tool, comprising:
a water-absorbent layer fabricated from a material that is suitable for transferring a volume of water;
a scrubbing outer layer fabricated from a metallic-mesh material and covering the water-absorbent layer;
a fire-resistant layer disposed outwardly of the water-absorbent layer, wherein the scrubbing outer layer covers both the fire-resistant layer and the water-absorbent layer;
wherein the grill-cleaning tool is wearable, and
further comprising an inner layer that is fabricated from a water-proof material and that is generally cylindrical in shape with a closed end and with an open end that is opposite the closed end for receiving a hand and forearm of a user,
wherein the water-absorbent layer, the fire-resistant layer and the scrubbing outer layer are also generally cylindrical in shape with a closed end and with an open end that is opposite the closed end,
wherein the layers are nested one inside another and are fastened together when the wearable grill-cleaning tool is in an assembled condition, and
wherein the closed end of each one of the water-proof inner layer, the water-absorbent layer and the fire-resistant layer is larger in the radial direction than the open end of each one of the water-proof inner layer, the water-absorbent layer and the fire-resistant layer.

4. The grill-cleaning tool of claim 3, wherein the water-absorbent layer and the fire-resistant layer are sewn together and are assembled into the wearable grill-cleaning tool as a single unit.

5. The grill-cleaning tool of claim 3, wherein the water-proof inner layer, the water-absorbent layer and the fire-resistant layer are each sized to extend approximately to a user's elbow.

6. The grill-cleaning tool of claim 3, comprising a plurality of circumferentially spaced-apart ribs extending radially inward from an inner surface of the water-proof inner layer and extending longitudinally along the length of the water-proof inner layer within the larger closed end thereof.

7. The grill-cleaning tool of claim 6, wherein each rib of the plurality of ribs is wider at a top portion thereof than at a base portion thereof.

8. The grill-cleaning tool of claim 6, comprising between 4 and 8 circumferentially spaced-apart ribs extending radially inward from the inner surface of the water-proof inner layer and extending longitudinally along the length of the water-proof inner layer within the larger closed end thereof.

9. The grill-cleaning tool of claim 3, wherein the water-proof inner layer is fabricated from heat-resistant silicone rubber.

10. The grill-cleaning tool of claim 3, wherein the scrubbing outer layer is fabricated from stainless-steel.

11. A grill-cleaning tool, comprising:
a water-absorbent layer fabricated from a material that is suitable for transferring a volume of water;
a scrubbing outer layer fabricated from a metallic-mesh material and covering the water-absorbent layer;
a fire-resistant layer disposed outwardly of the water-absorbent layer, wherein the scrubbing outer layer covers both the fire-resistant layer and the water-absorbent layer;
wherein the grill-cleaning tool is wearable, and
further comprising an inner layer that is fabricated from a water-proof material and that is generally cylindrical in shape with a closed end and with an open end that is opposite the closed end for receiving a hand and forearm of a user,
wherein the water-absorbent layer, the fire-resistant layer and the scrubbing outer layer are also generally cylindrical in shape with a closed end and with an open end that is opposite the closed end,
wherein the layers are nested one inside another and are fastened together when the wearable grill-cleaning tool is in an assembled condition; and
further comprising a plurality of fasteners disposed along an outer surface of the water-proof inner layer and a plurality of complementary fasteners disposed along an inner surface of the water-absorbent layer for cooperatively securing the water-absorbent layer to the water-proof inner layer.

12. A grill-cleaning tool, comprising:
a water-absorbent layer fabricated from a material that is suitable for transferring a volume of water;
a scrubbing outer layer fabricated from a metallic-mesh material and covering the water-absorbent layer;
a fire-resistant layer disposed outwardly of the water-absorbent layer, wherein the scrubbing outer layer covers both the fire-resistant layer and the water-absorbent layer;
wherein the grill-cleaning tool is wearable, and
further comprising an inner layer that is fabricated from a water-proof material and that is generally cylindrical in shape with a closed end and with an open end that is opposite the closed end for receiving a hand and forearm of a user,
wherein the water-absorbent layer, the fire-resistant layer and the scrubbing outer layer are also generally cylindrical in shape with a closed end and with an open end that is opposite the closed end,
wherein the layers are nested one inside another and are fastened together when the wearable grill-cleaning tool is in an assembled condition; and
further comprising a plurality of fasteners disposed along an outer surface of the fire-resistant layer and a plurality of complementary fasteners carried by the scrubbing outer layer for cooperatively securing the scrubbing outer layer to the fire-resistant layer.

* * * * *